June 9, 1959  M. S. GALLO  2,889,997
PORTABLE SPRAYER
Filed Aug. 3, 1956
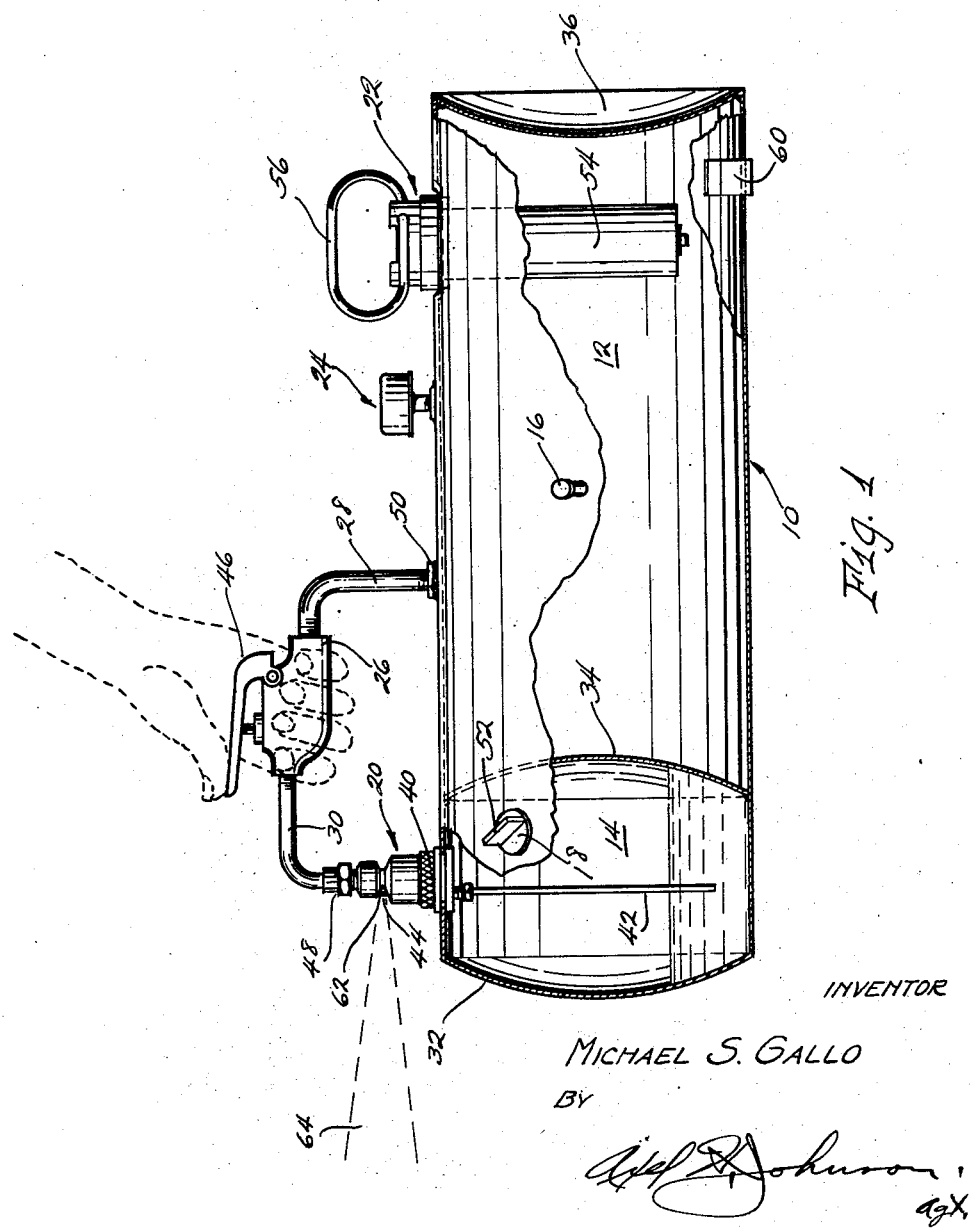
INVENTOR
MICHAEL S. GALLO
BY

United States Patent Office 2,889,997
Patented June 9, 1959

2,889,997

PORTABLE SPRAYER

Michael S. Gallo, Racine, Wis.

Application August 3, 1956, Serial No. 601,969

2 Claims. (Cl. 239—308)

This invention relates to portable sprayers or so called "foggers" used in barns or other farm buildings for killing flies, mosquitoes and other insects. It is also useful for "fogging" grass areas prior to picnics or other gatherings in order to eliminate the mosquito nuisance.

An object of this invention is to provide a portable fogger or sprayer.

Another object is to provide a portable sprayer or "fogger" having separate compartments for liquid and air supplies.

Another object is to provide a sprayer or "fogger" having a simplified, unitary container.

Another object is to provide a tank type portable sprayer or "fogger" having a combined carrying handle and actuating valve.

Another object is to provide a tank type sprayer having provision for supplying air under pressure, either from a power supply such as a compressor, or a hand pump.

Further objects and advantages of the invention will be apparent from a consideration of the following detailed description taken in connection with the accompanying drawing wherein a satisfactory embodiment of the invention is shown. However, it is to be understood that the invention is not limited to the details disclosed but includes all such variations and modifications as fall within the spirit of the invention.

Referring to the drawing:

Fig. 1 is a side elevational view of the sprayer or "fogger" with parts broken away to show the interior details.

Referring to Fig. 1, 10 is a cylindrical tank portion having an air compartment 12 and a spray-liquid compartment 14. A pressure valve 16 provides means of charging the air compartment 12 with air under pressure. A cap 18 permits filling compartment 14 with liquid, and a siphon spray head 20 communicates with compartment 14. A hand pump 22 permits building up air pressure in compartment 12 when a power supply is not convenient. An air pressure gauge 24 indicates the pressure in compartment 12. A hand valve 26 is provided and a conduit 28 connects the air compartment 12 to valve 26. A second conduit 30 connects valve 26 with liquid compartment 14.

Referring again to Fig. 1, 10 is the cylindrical tank portion which is made of any suitable material not apt to corrode such as copper, brass or galvanized steel. In this instance, tank 10 is made of sheet material with a welded seam. Tank ends 32, 34 and 36 are convex or concave as shown. End 32 is welded to tank 10 with the convex face outwardly. Ends 34 and 36 are positioned with their convex faces toward each other and welded about their peripheries as shown.

Spray head 20 is provided with a body portion 40 that extends into compartment 14. A siphon tube 42 extends to a point adjacent the bottom of the compartment 14. Tube 42 has a terminus at 44 and the usual orifice is provided in body 40 adjacent terminus 44. The other details of head 20 are obvious and need no further explanation as they are not the subject of the present invention and any suitable spray head may be used.

Hand valve 26 is of the conventional type and is positioned as shown and is provided with a hand trigger 46. Valve 26 is so formed as to also constitute a convenient handle as shown. A conduit 30 is threaded into valve 26 and communicates with spray head 20 by a union 48. A second conduit 28 provides a communication between air compartment 12 and valve 26. Conduit 28 is threaded into tank 10 by means of a collar 50 welded to the tank 10.

It is clear that actuating trigger 46 will permit air under pressure to flow from compartment 12 through conduit 28, valve 26 and conduit 30, to spray head 20, and across the terminus 44 of tube 42.

Cap 18 is provided with a portion 52 to facilitate turning by hand. Cap 18 is threaded into tank 10 at compartment 14. Pressure valve 16 is a conventional auto tire valve secured to tank 10 so as to provide means to supply air under pressure by power means such as an air compressor.

Hand pump 22 is of the usual design having a cylinder 54 with a piston, not shown. A handle 56 is connected to the piston and has provision for locking the piston after air under pressure has been supplied to compartment 12. Air pressure gauge 24 is of the usual type and needs no further explanation, except that it is threaded into a collar 58 previously welded into tank 10. A foot 60 is secured to tank 10 at the bottom thereof, so that the tank can rest on a floor without upsetting. When the sprayer is used it is held in the hand as shown. The thumb is pressed on trigger 46 and the liquid in compartment 14 is siphoned out of tube 42 at terminus 44 by air escaping from the orifice 62, and the resultant spray being identified at 64.

The above being a complete description of an illustrative embodiment of the invention, what is claimed as new and desired to be secured by Letters Patent of the United States is:

1. A portable sprayer to be carried by a hand comprising a cylindrical air-pressure compartment having inwardly-convex end portions, a cylindrical spray-solution compartment coaxial with said air compartment, one of said end portions forming a common end for said air compartment and said spray-solution compartment, the latter being provided with an outwardly-convex end portion opposed to said common end, means to provide air under pressure to said air compartment, a syphon spray head secured to said spray compartment and communicating with the latter, and an air conduit, extending externally between said air compartment and said spray-head, and an air control valve in said conduit controllable by said hand.

2. A portable sprayer to be carried by a hand, comprising a cylindrical air-pressure compartment having inwardly-convex end portions, a cylindrical spray-solution compartment coaxial with said air compartment, one of said end portions forming a common end for said air compartment and said spray-solution compartment, means to provide air under pressure to said air compartment, a syphon spray head secured to said spray compartment and communicating with the latter, and an air conduit extending externally between said air compartment and said spray-head, and an air control valve in said conduit controllable by said hand.

References Cited in the file of this patent

UNITED STATES PATENTS

| | | |
|---|---|---|
| 688,261 | Parks | Dec. 3, 1901 |
| 2,339,426 | Root | Jan. 18, 1944 |
| 2,613,111 | Freund | Oct. 7, 1952 |
| 2,637,596 | Lilienthal | May 5, 1953 |
| 2,648,569 | Vose | Aug. 11, 1953 |